(12) United States Patent
Russ et al.

(10) Patent No.: US 7,274,013 B1
(45) Date of Patent: Sep. 25, 2007

(54) AUTOMATIC GAIN ADJUST UTILITY FOR RADIATION SPECTROMETERS

(75) Inventors: William R. Russ, East Hampton, CT (US); Frazier L. Bronson, Branford, CT (US)

(73) Assignee: Canberra Industries, Inc., Meriden, CT (US)

( * ) Notice: Subject to any disclaimer, the term of this patent is extended or adjusted under 35 U.S.C. 154(b) by 121 days.

(21) Appl. No.: 10/461,760

(22) Filed: Jun. 13, 2003

(51) Int. Cl.
*G01D 18/00* (2006.01)

(52) U.S. Cl. .................................. 250/252.1
(58) Field of Classification Search ............. 250/251.1, 250/262, 252.1
See application file for complete search history.

(56) References Cited

U.S. PATENT DOCUMENTS

| | | | | |
|---|---|---|---|---|
| 3,521,064 A | * | 7/1970 | Moran et al. ............... | 250/261 |
| 4,394,574 A | * | 7/1983 | Grau et al. ................. | 250/262 |
| 4,560,275 A | * | 12/1985 | Goetz ......................... | 356/326 |
| 5,360,975 A | * | 11/1994 | Stoller ........................ | 250/262 |
| 5,600,135 A | * | 2/1997 | Jacobson .................... | 250/261 |
| 6,006,162 A | | 12/1999 | Haywood | |
| 2003/0016359 A1 | * | 1/2003 | Jung et al. .................. | 356/419 |

* cited by examiner

*Primary Examiner*—David Porta
*Assistant Examiner*—Djura Malevic
(74) *Attorney, Agent, or Firm*—John H. Crozier

(57) ABSTRACT

In a preferred embodiment, an automatic gain adjust method for radiation spectrometers, including: placing a calibration source emitting known energies at a radiation detector; acquiring a spectrum of the known energies; automatically analyzing the spectrum and comparing the spectrum with the known energies; automatically adjusting gain of an amplifier of the spectrum until peaks of the spectrum are in correct channels.

7 Claims, 2 Drawing Sheets

Illustration of Auto Gain Adjust algorithm

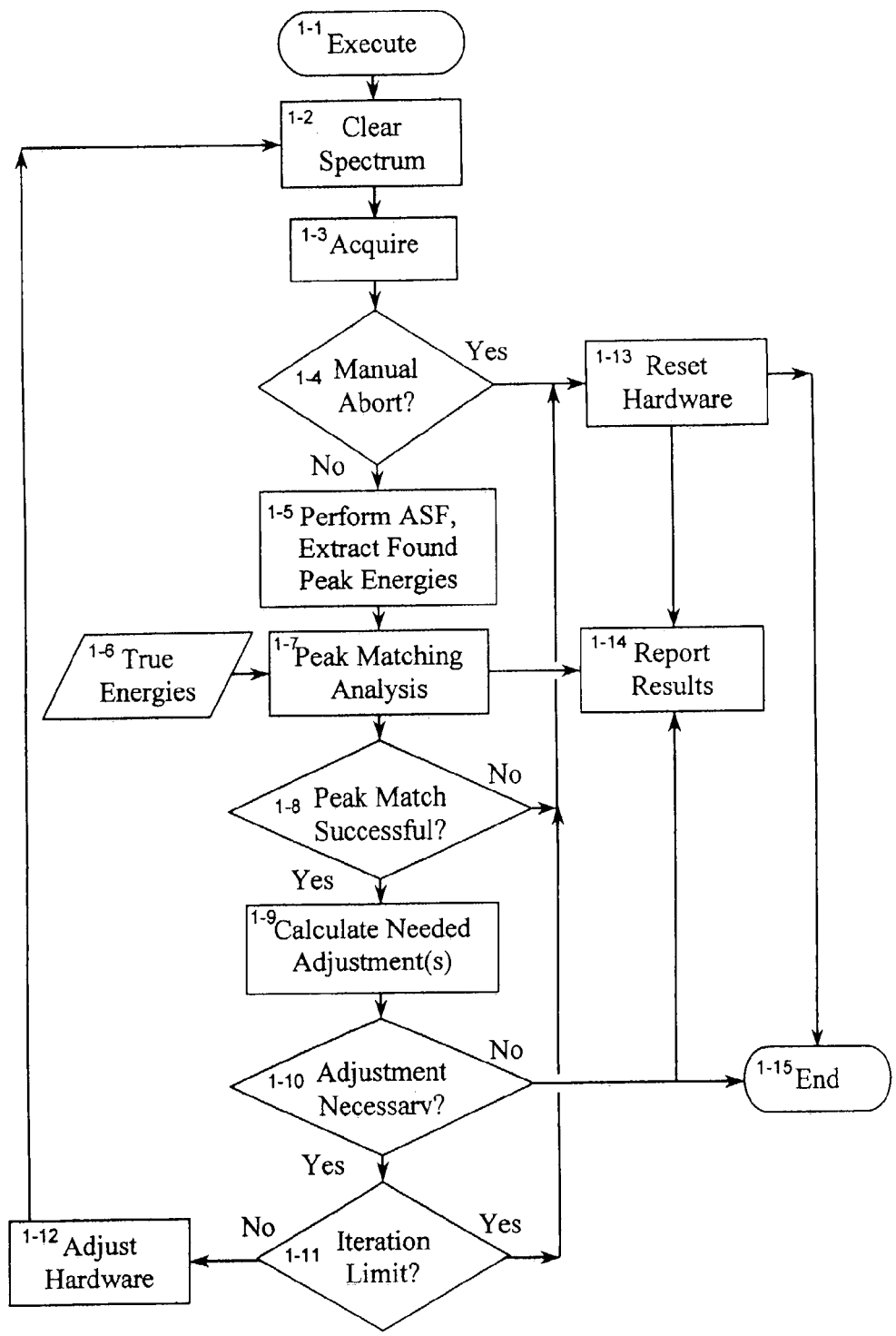
Figure 1 – Illustration of Auto Gain Adjust algorithm

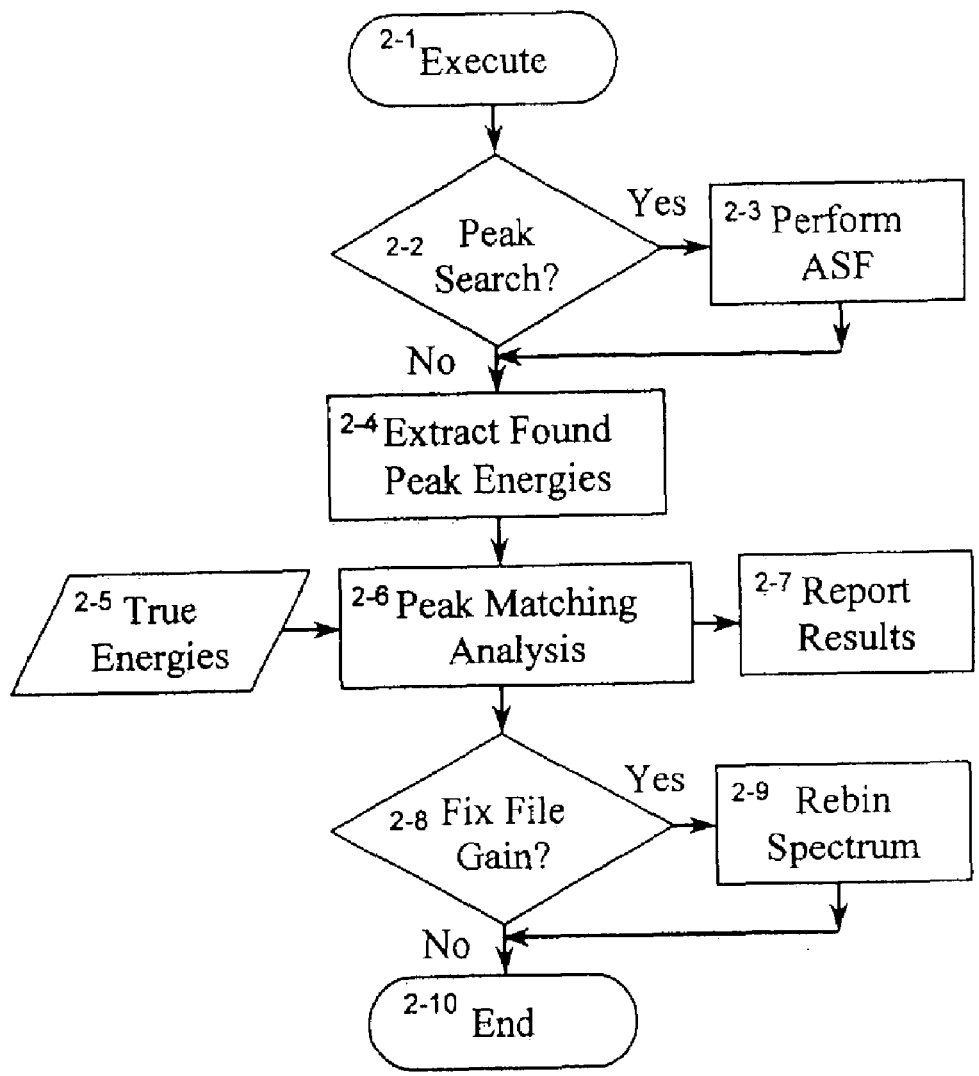
Figure 2 – Illustration of Gain Shift Evaluation algorithm

AUTOMATIC GAIN ADJUST UTILITY FOR RADIATION SPECTROMETERS

BACKGROUND OF THE INVENTION

1. Field of the Invention

The present invention relates to radiation spectrometers generally and, more particularly, but not by way of limitation, to a novel automatic gain adjust utility for such spectrometers.

2. Background Art

Changes in temperature and extended usage of radiation spectrometers may cause shifts in gain and/or zero settings.

Rather than having to recalibrate and/or manually adjust a datasource after excessive amplifier gain shift, it would be useful to be able to execute a software-driven automatic gain adjustment that would rematch the datasource to the existing energy calibration. With software-controlled electronics, an automated software utility to adjust amplifier gain and zero would be possible and beneficial. Benefits include further automation and consistency in setting up gamma spectroscopy systems. Having uniform spectra (common energy calibration) facilitates comparisons, consistency of analysis, and following of trends. Furthermore, the utility could be used periodically for checking, adjusting and tracking gain during extended campaigns of system usage. Such a utility could improve situations with less gain stability, such as industrial settings or scintillation detectors. A gain evaluation portion of the utility can be used to evaluate the quality of peak/energy identification and as a tool for future automated quality assurance (QA) procedures.

Accordingly, it is a principal object of the present invention to provide a a software-driven automatic gain adjustment that rematches a data source to existing energy calibrations.

A further object of the invention is to provide such an automatic gain adjustment that provides consistency and ease in setting up spectroscopy systems.

An additional object of the invention is to provide such an automatic gain adjustment that facilitates comparisons, consistency of analysis, and following of trends.

It is another object of the invention to provide such an automatic gain adjustment that can be used periodically for checking, adjusting, and tracking gain during extended campaigns of system usage.

It is yet a further object of the invention to provide such an automatic gain adjustment that improves situations with less gain stability, such as industrial settings or scintillation detectors It is yet an additional object of the invention to provide such an automatic gain adjustment that can be used to evaluate the quality of peak/energy identification and as a tool for future automated QA procedures.

It is yet another object of the invention to provide such an automatic gain adjustment that is easily implemented.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an automatic gain adjust method for radiation spectrometers, comprising: placing a calibration source emitting known energies at a radiation detector; acquiring a spectrum of said known energies; automatically analyzing said spectrum and comparing said spectrum with said known energies; automatically adjusting gain of an amplifier of said spectrum until peaks of said spectrum are in correct channels.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which:

FIG. 1 is a logic flowchart illustrating the basic algorithm of the present invention.

FIG. 2 is a logic flowchart of the gain evaluator algorithm.

DETAILED DESCRIPTION OF THE PREFERRED EMBODIMENTS

In the system of the present invention, a calibration source emitting known energies is placed at the detector of the measurement system. After automatically acquiring a spectrum, found peak energies are automatically analyzed and compared with the known energies of the calibration source. Then the results of the analysis are reported and the gain of the amplifier is automatically adjusted. Such automatic acquisition, analysis, and adjustment are performed iteratively until measured peak energies satisfactorily correlate to proper spectral channels according to the energy calibration. For static spectral data files or measurement systems without a computer-controlled amplifier, the same analysis can be applied to evaluate the possible gain shift in the acquired spectrum. The evaluation then provides the ability to rebin the file spectrum or recommend the manual gain adjustment to match the energy calibration.

The utility of the present invention is intended to be used both while establishing operation of a measurement system and during extended operations as an intermittent step for QA purposes. The user is able to start up the system using this utility to make valid the existing/desired energy calibration. Also, the user is able to occasionally run the utility between acquisitions to validate the quality of the intervening acquisitions and track any shifts in gain. This is made as easy as possible for the user. While providing for ease of operation as an integrated component in Genie 2000 (software developed by Canberra Industries, Inc., and well known in the industry), the utility can also be leveraged by higher-level software to handle scheduling, batch processing, and interfacing with hardware. This requires the ability to act as a stand-alone component with appropriate arguments and methods, where the layered application would provide the interface.

Reference should now be made to the drawing figures.

Auto Gain Adjust Algorithm

The steps executed by the auto gain adjust algorithm are shown in FIG. 1.

Step Descriptions

1-1, Execute

The user indicates the processing parameters and starts. Such parameters include the certificate file with the list of reference (true) energies, the peak search Analysis Sequence File (ASF) to be carried out after each acquisition to determine the found peak energies, the iteration acquisition time and the iteration limit.

1-2, Clear Spectrum

Reset the spectrum channels prior to starting a new acquisition.

1-3, Acquire

An acquisition is automatically conducted for the time initially specified by the user.

1-4, Manual Abort?

If the user selects cancel/abort during any iteration, all adjustments made so far are reset prior to ending the algorithm.

1-5, Perform ASF, Extract Found Peak Energies

After each acquisition, an ASF, initially specified by the user, is automatically performed. The ASF conducts a peak search with the resulting analysis results embedded in the datasource file. The list of found peak energies are automatically extracted from the file for subsequent use in the peak matching analysis.

1-6, True Energies

Reference (true) energies are extracted from the certificate file initially specified by the user and are provided for subsequent use in the peak matching analysis.

1-7, Peak Matching Analysis

The peak matching analysis engine takes the list of true energies from the initially specified certificate file and the found peak energies from the most recent peak search as inputs. Any validated matches between the true and found energies are output. See the section on Peak Matching Analysis for details.

1-8, Peak Match Successful?

If no true-found peak matches are validated or the quality of the validated matches does not exceed a confidence threshold specified by the user, all adjustments made so far are reset prior to ending the algorithm.

1-9, Calculate Needed Adjustment(s)

Validated true-found peak matches are used to calculate needed adjustments in amplifier gain and/or analog-to-digital converter (ADC) zero. The required zero adjustment is determined by comparing the energy calibration offset to the offset determined from the validated matches. The required gain adjustment is determined by averaging the gain correction factors [(true energy−offset)/(found energy−offset)] from each validated match, weighted by their uncertainties.

1-10, Adjustment Necessary?

If calculated adjustments are less than their uncertainties, the algorithm is successfully completed. Otherwise, iterations continue.

1-11, Iteration Limit?

If adjustment is still needed but the iteration is at the iteration limit initially specified by the user, all adjustments made so far are reset prior to ending the algorithm.

1-12, Adjust Hardware

The calculated adjustments needed are applied to the hardware. Each specific make and model of equipment requires a separate software driver to best implement adjustments. Since different computer-controlled amplifiers possibly have different physical components with different ranges, the algorithm used for amplifier adjustment will be amplifier specific. In all cases, the input provided would be the net gain desired. In general, the adjustments should be implemented by adjusting the finest gains first, but if a coarser gain does need to be changed, the finer gains should be set, if possible, so that the coarser gains can be set as high as possible. It is desirable to minimize adjusting the discrete coarse gain and to keep the fine gain near the upper region of its range. The super-fine gain can be adjusted full range without consideration. Only some hardware allows for adjustment of the ADC zero, adjusting the energy zero term.

1-13, Reset Hardware

If the algorithm fails to complete successfully, the original hardware settings are restored. Failure results from a manual abort, unsuccessful peak matching, or reaching the iteration limit.

1-14, Report Results

After every peak matching analysis, and upon successful or unsuccessful completion, the results are reported to the user.

1-15, End

The algorithm has concluded. This can be accomplished by a manual abort, unsuccessful peak matching, iteration limit, or successful completion.

Gain Shift Evaluation Algorithm

The steps executed by the gain shift evaluation algorithm are shown in FIG. 2.

Step Descriptions

2-1, Execute

The user indicates the processing parameters and starts. Such parameters include the certificate file or nuclide library file with the list of reference (true) energies, and the peak search Analysis Sequence File (ASF) to be carried out to determine the found peak energies if specified.

2-2, Peak Search?

If specified, the ASF will be performed to conduct a peak search analysis. If the datasource already has undergone a peak search analysis, the results will already be present in the file and another analysis may not be required.

2-3, Perform ASF

When specified, the ASF conducts a peak search with the resulting analysis results becoming embedded in the datasource file. The list of found peak energies are automatically extracted from the file for subsequent use in the peak matching analysis.

2-4, Extract Found Peak Energies

The list of found peak energies are automatically extracted from the file for subsequent use in the peak matching analysis.

2-5, True Energies

The list of reference (true) energies are extracted from the specified certificate file or nuclide library to be provided as input for the peak matching analysis.

2-6, Peak Matching Analysis

The peak matching analysis engine takes the list of true energies from the initially specified certificate file or nuclide library and the found peak energies from the extracted peak search results as inputs. Any validated matches between the true and found energies are output. See the section on Peak Matching Analysis for details.

2-7, Report Results

Results are provided to the user for evaluation. Results include the output validated matches between true and found energies from the peak matching analysis, as well as the degree of shift from the energy calibration and an interpretation of the impact on nuclide identification analysis. The amount of manual adjustment required is provided.

2-8, Fix File Gain?

After evaluating the report results, the user may wish to adjust the file spectrum to revalidate the energy calibration and improve subsequent nuclide identification analysis.

2-9, Rebin Spectrum

Automatically rebin the spectrum (via Canberra Industry's Normalize batch command), effectively shifting the spectrum gain to make valid the energy calibration.

2-10, End

The algorithm has concluded. The user may change the processing parameters and execute the algorithm again, especially if changes were made to the datasource such as a spectrum rebinning, but the gain shift evaluation algorithm is not inherently iterative.

Peak Matching Analysis

Inputs for peak matching analysis include the list of reference (true) energies, uncertainties, and expected count rates and the list of measured (found) energies, uncertainties and count rates. If the user provides only a single true peak energy, the best match is selected by proximity to the true energy and count rate criteria.

For multiple true energies provided by the user, the peak matches would be determined by establishing a matrix, with one dimension representing the true peak energies and the other dimension representing the found peak energies. The hypothetical gain correction factor for each true energy-found energy combination would be calculated per the equation:

$$\text{gain correction factor} = \frac{(\text{true energy} - \text{offset})}{(\text{found energy} - \text{offset})} \quad (1)$$

Each of these hypothetical gain correction factors would then be scored according to how often values appear in the matrix within matching tolerance, excluding those with the same true or found energy. Scores are incremented by one each time another pairing has a hypothetical gain correction factor within matching tolerance. Matching tolerance is the uncertainty of the concerned true and found energies summed in quadrature and multiplied by an optimized gain tolerance factor. The gain tolerance factor is selected by iteratively picking values until the smallest value is determined that provides the largest number of validated matches. Scores could also be biased by how well count rates correspond to expected count rates.

True energies are then tentatively matched with found energies having the highest score above zero for that true energy. Ties result in multiple found energies being tentatively matched to a given true energy. Once these tentative matches are made, ambiguities must be resolved.

First, candidate matches must be removed that do not belong to the primary cluster. The weighted average gain correction factor of all the candidate matches is calculated (weighted according to respective matching tolerance). If all of the candidate match gain correction factors don't fall within respective matching tolerances of the weighted average gain correction factor, the candidate furthest out of tolerance is removed. A new average is calculated and again tolerances are checked, followed by outlier removal if necessary. Such outlier removal iterations continue until match tolerances are satisfied, ensuring all remaining candidate matches have close to the same gain correction factor, corresponding to that of the dominant cluster.

Next, candidate matches that cannot logically coexist must be removed. If surviving candidate matches have the same found or true energies, all such matches are removed.

Finally, the remaining set of peak matches should represent a sufficiently significant primary cluster that it can be confidently distinguished from background clusters while possibly allowing for some extraneous or missing found peak energies. While the peak matching analysis will output all of the remaining candidate matches, the calling utility will be able to determine whether to use the results based on the confidence in the output. The decision to use the output validated matches depends on whether the calculated confidence exceeds a confidence threshold specified by the user. The confidence can be determined using the ratio of the number of validated matches to the number of maximum possible matches, how well the calculated offset corresponds to the energy calibration offset, and the amount of gain correction determined. The maximum number of possible matches is the number of input true energies or found energies, whichever is less.

In the embodiments of the present invention described above, it will be recognized that individual elements and/or features thereof are not necessarily limited to a particular embodiment but, where applicable, are interchangeable and can be used in any selected embodiment even though such may not be specifically shown.

It will thus be seen that the objects set forth above, among those elucidated in, or made apparent from, the preceding description, are efficiently attained and, since certain changes may be made in the above method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention that, as a matter of language, might be said to fall therebetween.

The embodiments of the invention in which an exclusive property or privilege is claimed are defined as follows:

1. An automatic gain adjust method for radiation spectrometers, comprising the steps of:
   (a) exposing a detector of an ionizing radiation measurement system to emissions from a calibration source of known characteristic energies, such that a single sensor measures continuous spectral energy distribution of individual emissions from said calibration source;
   (b) approximating said continuous spectral energy distribution by binning energy deposited by individual photons into a series of quantized energy ranges; and
   (c) automatically adjusting amplifier hardware settings in accordance with specified performance parameters to sufficiently match system response to a previous energy calibration; wherein:
   step (c) includes iteratively performing:
   (d) spectral data acquisition;
   (e) peak energy analysis of acquired spectrum to determine centroid energies as defined per said energy calibration;
   (f) calculating needed system gain by correlating results of said peak energy analysis to known characteristic energies and expected intensities emitted by said calibration source, pairing peaks with energies by exhaustively evaluating progressive single pairings to achieve a greatest number with minimal pair gain variance and best match to expected relative peak areas, and required system gain is an average of matched pair gains, weighted by respective uncertainties;

(g) changing amplifier hardware settings to achieve required system gain; and (h) repeating steps (d) through (g) until either a specified operational limit is reached or system response is within specified tolerance of matching energy calibration.

2. An automatic gain adjust method for radiation spectrometers, as defined in claim 1, further comprising: step (a) includes a computer controlled amplifier.

3. An automatic gain adjust method for radiation spectrometers, as defined in claim 1, further comprising: step (a) includes a previously determined accurate energy calibration.

4. An automatic gain adjust method for radiation spectrometers, as defined in claim 1, wherein: said spectral data acquisition is carried out for a preset time.

5. An automatic gain adjust method for radiation spectrometers, as defined in claim 1, wherein: said peak energy analysis of acquired spectrum determines found peak areas.

6. An automatic gain adjust method for radiation spectrometers, as defined in claim 1, wherein: said amplifier settings are changed automatically.

7. An automatic gain adjust method for radiation spectrometers, as defined in claim 1, wherein: said amplifier settings are changed manually.

* * * * *